US012219291B2

(12) United States Patent
Springer

(10) Patent No.: US 12,219,291 B2
(45) Date of Patent: Feb. 4, 2025

(54) VISUAL ECHO CANCELLATION

(71) Applicant: Zoom Communications, Inc., San Jose, CA (US)

(72) Inventor: Shane Paul Springer, Manchester, MI (US)

(73) Assignee: Zoom Communications, Inc., San Jose, CA (US)

( * ) Notice: Subject to any disclaimer, the term of this patent is extended or adjusted under 35 U.S.C. 154(b) by 122 days.

(21) Appl. No.: 17/862,689

(22) Filed: Jul. 12, 2022

(65) Prior Publication Data

US 2024/0020800 A1    Jan. 18, 2024

(51) Int. Cl.
*H04N 7/15* (2006.01)
*G06V 40/16* (2022.01)
*H04N 7/14* (2006.01)

(52) U.S. Cl.
CPC ............. *H04N 7/15* (2013.01); *G06V 40/172* (2022.01); *H04N 7/14* (2013.01)

(58) Field of Classification Search
None
See application file for complete search history.

(56) References Cited

U.S. PATENT DOCUMENTS

| 11,032,513 | B2 | 6/2021 | Pell | |
|---|---|---|---|---|
| 2005/0180631 | A1* | 8/2005 | Zhang | H04N 7/15 348/E7.083 |
| 2009/0251527 | A1* | 10/2009 | Gachignard | H04N 7/144 348/E7.083 |
| 2022/0058775 | A1* | 2/2022 | Duan | H04N 19/86 |
| 2022/0269469 | A1* | 8/2022 | Kennedy | G06Q 10/103 |
| 2022/0318954 | A1* | 10/2022 | Wu | G06T 5/60 |
| 2023/0140114 | A1* | 5/2023 | Grover | G06V 20/48 348/14.08 |
| 2023/0171300 | A1* | 6/2023 | Zhang | H04N 1/4493 348/14.07 |

OTHER PUBLICATIONS

Machine Learning is Transforming video Conferencing Industry, https://talkcmo.com/interviews/machine-learning-isptransforming-video- . . . , Sneha Bokil, Mar. 17, 2020, 6 pages.
Difference Between Computer Vision and Image Recognition, https://deepomatic.com/difference-between-computer-vision-and-image- . . . , EWAN, Jun. 26, 2017, 4 pages.
Visual Echo Cancellation in a Projector-Camera-Whiteboard System, University of Illinois at Urbana-Champaign, Hanning Zhou, Zengyou Zhang, Thomas Huang, 2004, 4 pages.

* cited by examiner

*Primary Examiner* — Quoc D Tran
(74) *Attorney, Agent, or Firm* — Young Basile Hanlon & MacFarlane, P.C.

(57) ABSTRACT

A computing device outputs, to a display of the computing device during a video conference, remotely-generated visual data obtained from at least one remote device and camera-generated visual data captured using a camera of the computing device. The computing device identifies, within the camera-generated visual data, a reflection of at least a portion of data displayed at the display of the computing device. The computing device modifies the camera-generated visual data to remove the reflection. The computing device outputs, to the display of the computing device during the video conference, the modified camera-generated visual data. The computing device transmits the modified camera-generated visual data to the at least one remote device for display thereat during the video conference.

19 Claims, 9 Drawing Sheets

VISUAL ECHO CANCELLATION

FIELD

This disclosure relates to visual echo cancellation, in particular, for use with software services implementing a video conference or a video recording session to remove visual echoes appearing during such video conferences or video recording sessions.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
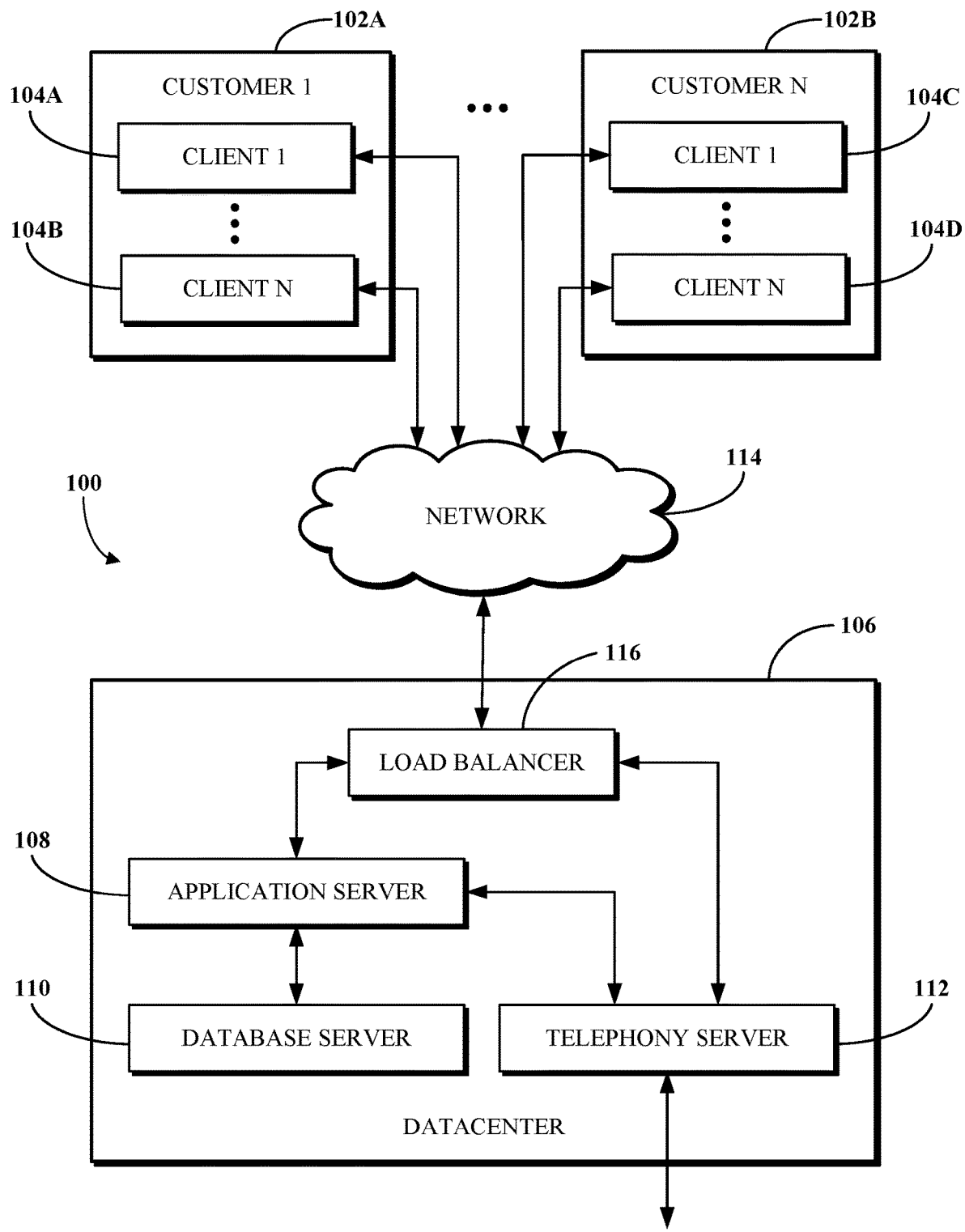
FIG. 1 is a block diagram of an example of an electronic computing and communications system.

Conferencing software is frequently used across various industries to support video-enabled conferences between participants in multiple locations. In some cases, each of the video conference participants separately connects to the conferencing software from their own remote locations. In other cases, one or more of the video conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

During a video conference, a display unit of a computing device participating in the video conference may display remotely-generated visual data from remote devices participating in the video conference and camera-generated visual data from a camera of (or connected to) the computing device. Generally, remotely-generated visual data includes or otherwise refers to visual data from a device different from the computing device that is participating in the conference, for example, visual data generated by a camera of a remote device or screensharing data from a remote device. Camera-generated visual data includes or otherwise refers to visual data generated by a camera of the computing device including, for example, imagery of one or more participants proximate to the computing device and their surroundings (e.g., in a conference room). In some cases, the camera-generated data may include a reflection of some or all of the data displayed at the display unit, for example, due to the presence of a mirror, a window, or a blank monitor in a field of view of the camera. These reflections, which may be referred to as visual echoes, may be distracting to the participants in the video conference, including the user of the computing device and the remote participants. In addition, these reflections might cause false positives in artificial intelligence algorithms that identify faces of participants in the video conference.

In one example scenario, a user may be participating in a video conference using a laptop while sitting in front of a dark window (e.g., in the evening or early morning). The screen of the laptop may reflect in the dark window, and the imagery from the dark window, including the reflection of the screen of the laptop, may be captured by a camera of the laptop. Facial recognition technology may be used to process the camera-generated visual data from the camera of the laptop to identify participants participating in the conference via the laptop. The user may be correctly identified by the facial recognition technology. Furthermore, a remote user, whose image was reflected in the dark window, could be incorrectly recognized by the facial recognition technology as participating in the conference via the laptop. In addition, remote users (who receive the camera-generated visual data via the network) would see the reflection of the laptop screen in the window and might have an unpleasant viewing experience as a result.

Acoustic echo cancellation (AEC) may include techniques used in audio communication (such as telephony) to improve voice quality by preventing echo from being created or removing the echo after the echo is already present. AEC techniques generally work by detecting an acoustic signal traveling in a first direction of an audio connection and then adjusting the acoustic signal traveling in a second direction of the audio connection to remove that acoustic signal. As a result of AEC, a user of audio communications technology does not hear the echo of their own voice and has a better communication experience. For example, if Anne telephones Bill and Bill uses a speakerphone, when Anne speaks, the microphone of Bill's speakerphone could pick up Anne's voice and transmit it back to her. AEC technology would prevent the retransmission of Anne's voice from Bill's speakerphone back to Anne.

In video conferencing, a parallel problem to that solved by AEC may occur. Specifically, a remote user's face may be displayed on a local display unit and may be reflected, via a reflective surface in the conference room (or other room), onto a video camera, for example, as described above with the laptop reflecting onto the dark window. The reflection may be transmitted back to the remote user. Thus, the remote user might see the reflection of their face, similar to how they might hear an echo of their own voice when using an audio communication technology that does not implement AEC. In some cases, facial recognition software may erroneously recognize the reflection as a real human face, and assume that an extra participant is in the location where the reflection was generated. Some implementations disclosed herein are related to solving this "visual echo" problem.

Implementations of this disclosure address problems (with visual reflections) such as these using visual echo cancellation. A computing device that is participating in a video conference displays data including remotely-generated visual data from at least one remote device and camera-generated visual data from a camera of the computing device. The computing device identifies, within the camera-generated visual data, a reflection of at least a portion of the displayed data. For example, the reflection may appear due to a reflective window or a mirror being behind the display unit of the computing device and in a field of view of the camera. The computing device modifies the camera-generated visual data to remove the reflection. For example, the computing device may store an image of the conference room where it is located when the conference room is empty. The computing device may replace the reflection with a portion of the image of the conference room that corresponds to the location of the reflection (e.g., replacing a window with a reflection with the portion of the stored image corresponding to that window which lacks reflections). Alternatively, the computing device may replace the reflection with a default image (e.g., a company logo) stored at the computing device. The computing device displays the modified camera-generated visual data at the display unit of the computing device, and transmits the modified camera-generated visual data to remote devices participating in the video conference.

To describe some implementations in greater detail, reference is first made to examples of hardware and software structures used to implement visual echo cancellation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
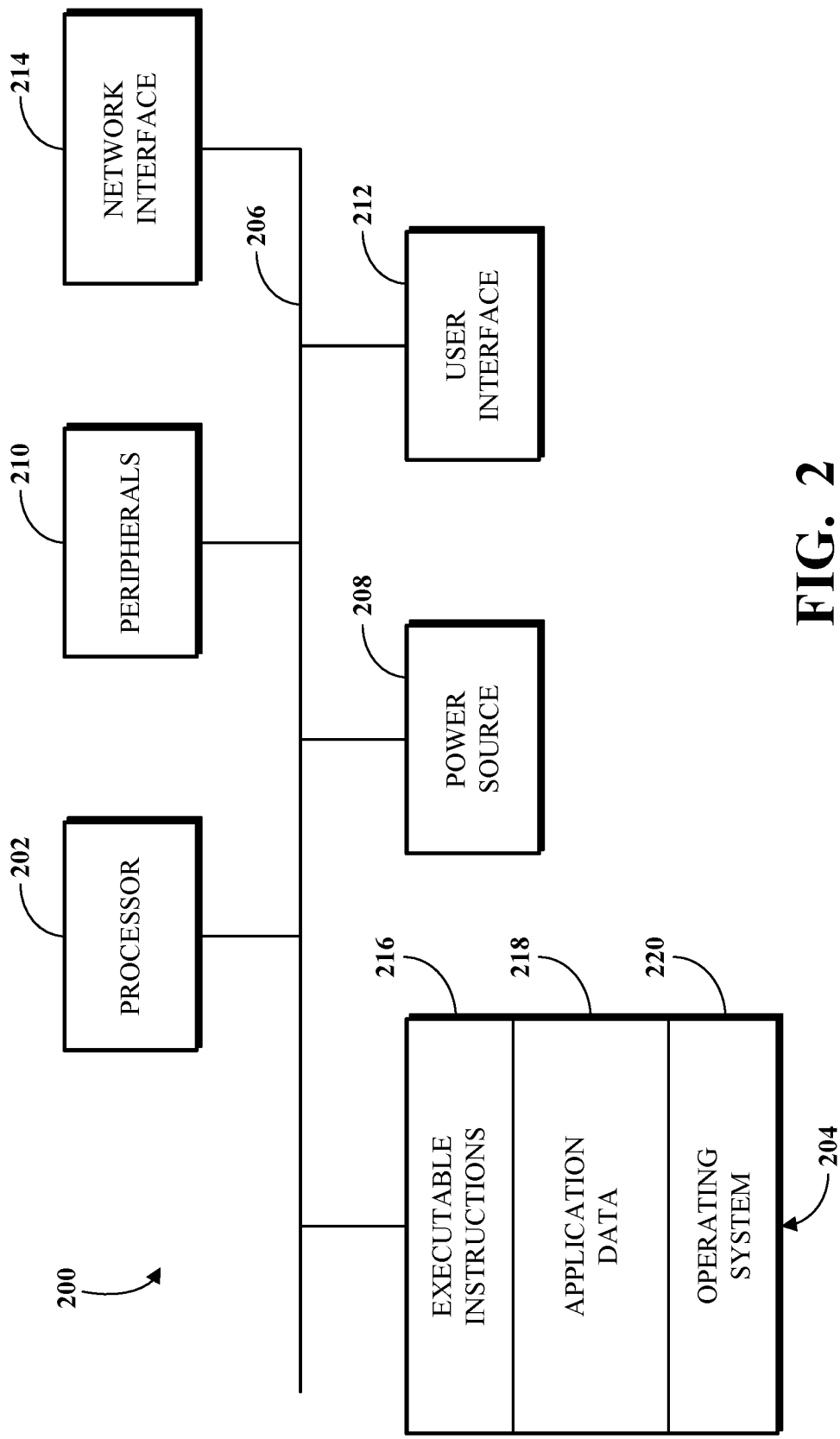
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
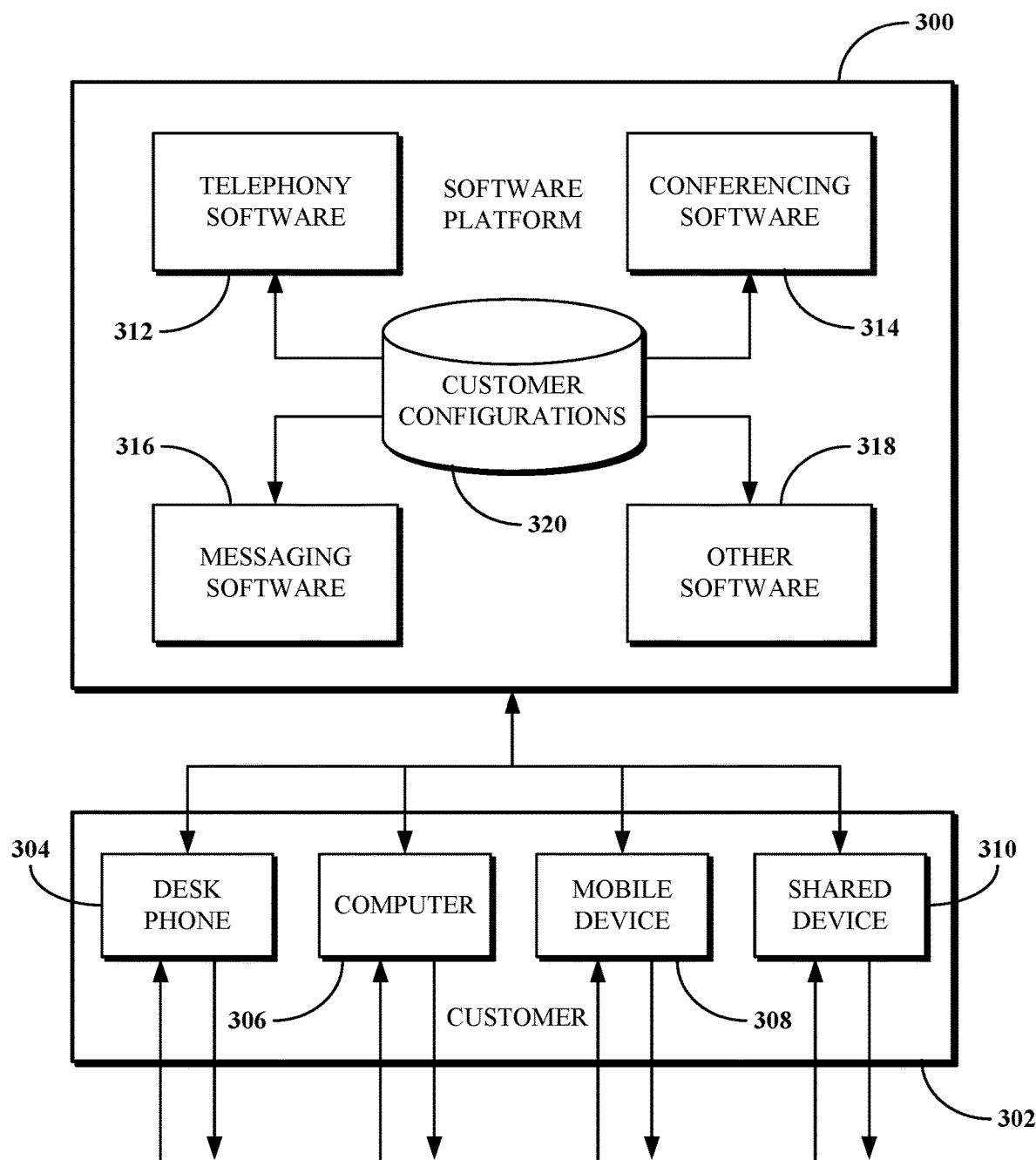
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for visual echo cancellation. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
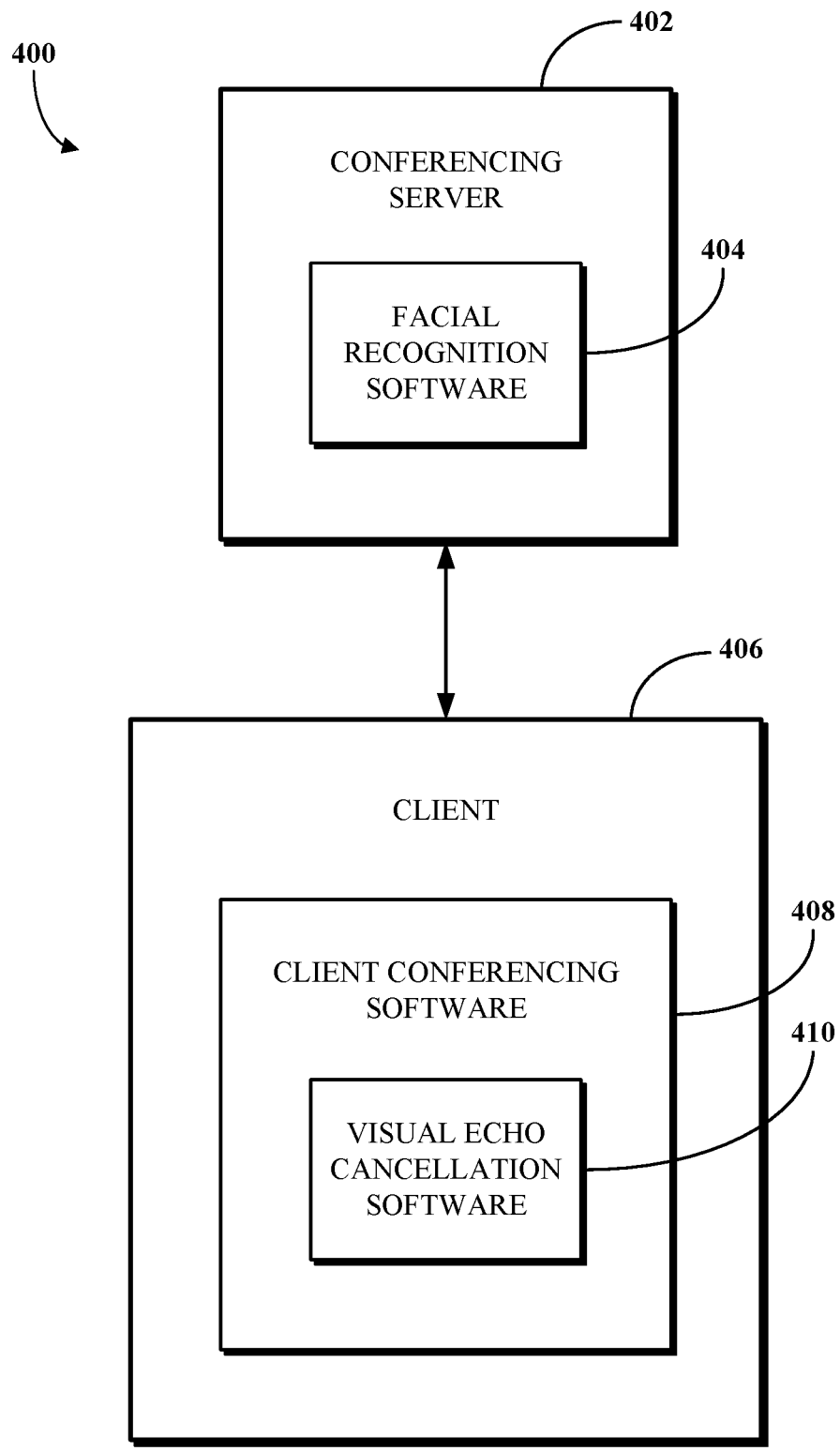
FIG. 4 is a block diagram of an example system in which visual echo cancellation during a video conference or video recording may be implemented.

FIG. 4 is a block diagram of an example system 400 in which visual echo cancellation during a video conference or video recording may be implemented. As shown, the system 400 includes a conferencing server 402 that executes, interprets, or otherwise runs facial recognition software 404, and a client 406 that executes, interprets, or otherwise runs client conferencing software 408. The client conferencing software 408 includes visual echo cancellation software 410. The conferencing server 402 is a server used to implement a video conference, for example, using the conferencing software 314. For example, the conferencing server 402 may correspond to the application server 108. The facial recognition software 404 may be implemented during a video conference to recognize participants of the video conference, and may be a component of the conferencing software 314. The client 406 may correspond to one of the clients 104A through 104D or 304 through 310. The client conferencing software 408 may interface with the conferencing software 314 and may include software that causes the client 406 to participate in a video conference, for example, by transmitting and/or receiving audio and/or visual data associated with the video conference. The visual echo cancellation software 410 includes software to identify and remediate visual echo events in visual data associated with a camera of the client 406.

FIG. 4 illustrates a single client 406. However, it should be noted that multiple clients might be participating in conferences simultaneously, and each conference typically includes at least two clients. A single client conference is possible, for example, if a user is using the client conferencing software 408 to record a video of themselves (e.g., for future asynchronous viewing by others using a recording service associated with the conferencing software 314). A single client conference may also be used to test features of the client conferencing software 408, for example, to verify that the client conferencing software 408 is working correctly before a conference with other participants. Alternatively, a video recording session may be implemented locally at the client device (which may or may not be connected to a network), without using the video conferencing software. A video recording session may be implemented locally at the client 406, using the camera thereof or connected thereto, and may implement the technology described herein for visual echo cancellation if visual echoes are detected in the camera-generated visual data of the client device.

The facial recognition software 404 uses facial recognition techniques to identify faces of participants of video conferences. The identified faces could be used to tag users as participating in the video conference. Any facial recognition technique could be used by the facial recognition software 404. The input may be a real-time generated image, or video frame, of a video stream associated with one or more conference participants. According to some examples, the input is processed via a machine learning model, such as a conventional neural network (CNN). A first layer of the CNN may detect edges within the input image or video frame. Additional layers may identify facial features and faces themselves. Further layers may attempt to map the face to a stored identifier of a person (e.g., who participated in other video conferences, who is a member of an employee directory, or who provided an image of their face to create an account for participating in video conferences). The facial recognition software 404 may be implemented using the CNN which is trained using a labeled dataset of human faces, such as MegaFace® or LFW® (Labeled Faces in the Wild®). Alternatively, other types of artificial neural networks (or other artificial intelligence or machine learning technologies) or other machine learning models may be used to implement the facial recognition software 404.

The client conferencing software 408 allows the client 406 to participate in a video conference via the conferencing software 314, as mentioned above The client conferencing software 408 may, for example, include software to capture, via a microphone and a camera of the client 406, video for transmission via the video conference and output, via a display of the client 406, visual data (e.g., camera-generated visual data or remotely-generated visual data) associated with the video conference and, output, via a speaker of the client 406, audio associated with the video conference.

As shown, the client conferencing software 408 includes visual echo cancellation software 410. The visual echo cancellation software 410 removes visual echoes (e.g., reflections of displayed data) from the camera-generated visual data prior to transmission of the camera-generated visual data to other devices participating in the video conference and/or to the facial recognition software 404. The visual echo cancellation software 410 identifies, within visual data generated by a camera of the client 406, a visual echo based on a comparison between visual data displayed on a display of the client 406 and visual data generated by the camera. The visual echo cancellation software 410 modifies the visual data generated by the camera to remove the identified visual echo (e.g., by replacing the identified visual echo with a stored image, such as a company logo or a part of an image of a location where the visual echo was generated prior to the appearance of the visual echo). The modified visual data is then transmitted via the video conference and/or provided to the facial recognition software 404.

Figure 5:
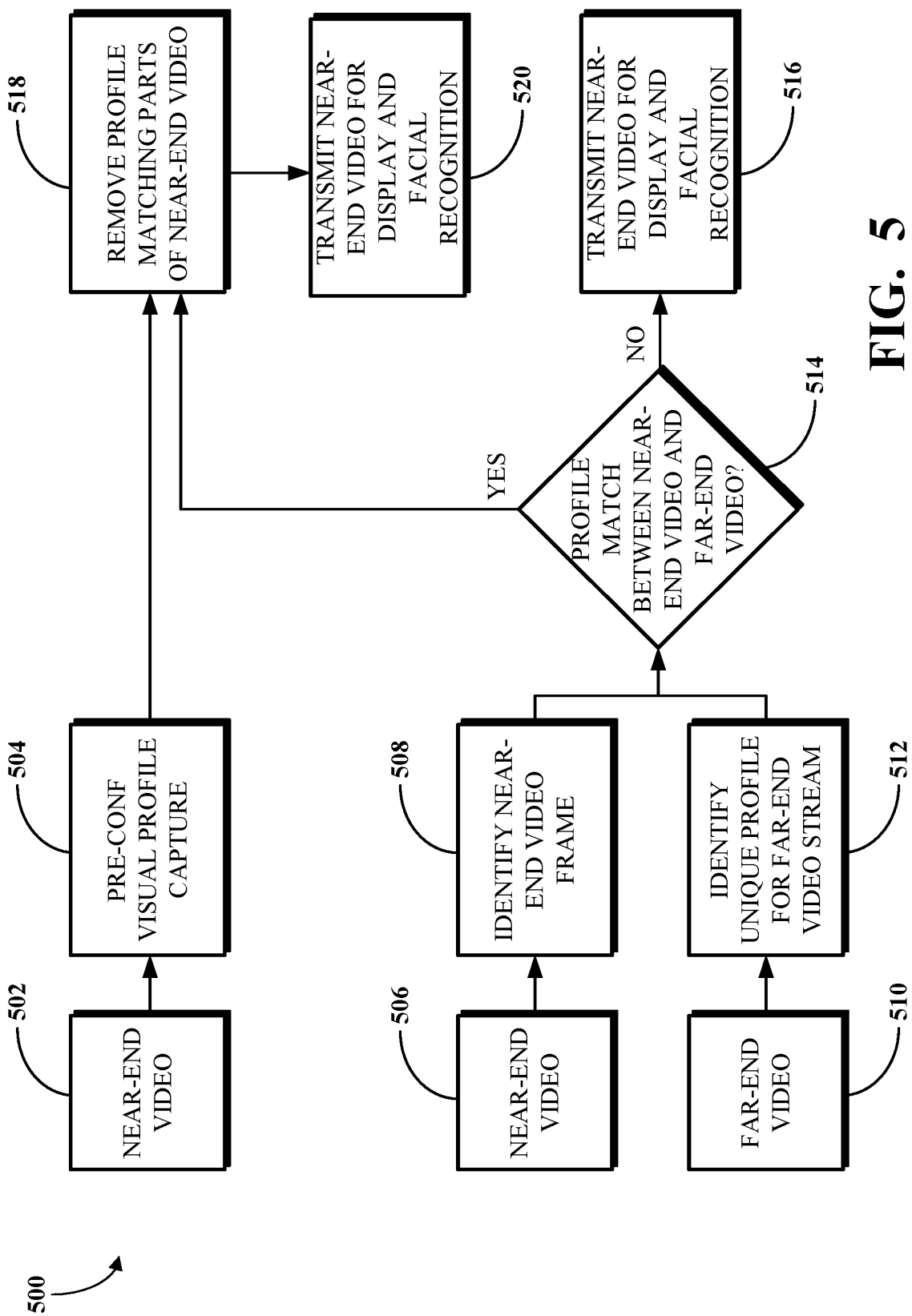
FIG. 5 is a block diagram of an example of a visual echo cancellation workflow performed using a system in which visual echo cancellation may be implemented.

FIG. 5 is a block diagram of an example of a visual echo cancellation workflow 500 performed using a system in which visual echo cancellation may be implemented, for example, the system 400 shown in FIG. 4. For example, the visual echo cancellation workflow 500 may be performed at the client 406 or another client or device participating in a video conference.

At 502, prior to a video conference, the client obtains near-end video via a camera of the client or connected to the client. At 504, the client captures a pre-conference visual profile, for example, of a conference room (or other location) where the client is located. The pre-conference visual profile includes visual data while a conference is not ongoing. As a result, there might not be any visual echo events, such as reflections of the display of the client. The client may prompt the user to verify that there are no visual echo events, and to cover the display of the client and/or sources of reflections if there are visual echo events. Alternatively, the client may detect visual echo events (as described in detail below) and request that the user make adjustments (e.g., placing a curtain over a window, covering a mirror, or moving a monitor) to a space occupied by the client to remove the visual echo events.

At 506, during the video conference, the client obtains (e.g., via the camera) near-end video, which generally includes or otherwise refers to a video stream captured using the camera of or otherwise coupled to the client. At 508, the client identifies a near-end video frame or the near-end video.

At 510, the client receives far-end video via the video conference. The far-end video generally includes or otherwise refers to video content other than of a near-end video. The far-end video may include screensharing video or camera-generated video from remote device(s) participating in the video conference. At 512, the client identifies a unique profile for a far-end video stream. The unique profile may be used to determine whether a set of pixel corresponds to a reflection of the far-end video stream. For example, the unique profile may be a mathematical function of color values of some of the pixels or the color values themselves.

At 514, the client determines whether a profile match exists between the near-end video and the far-end video. The determination may be made based on the unique profile of the far-end video. The client may determine, using artificial intelligence or other image processing techniques, whether a frame of the near-end video includes a visual echo. The determination whether the near-end video includes a visual echo may be based on a contemporaneous frame of the far-end video. In one example a reflection of all or part of the contemporaneous frame of the far-end video (e.g., in a window) may be detected in the frame of the near-end video. The reflection may be refracted or distorted relative to the original version of the contemporaneous frame of the far-end video displayed at the display of the client. An example of a visual echo is shown and described below with respect to FIG. 6A. If the profile match is determined not to exist, processing continues to 516. If the profile match is determined to exist, processing continues to 518.

At 516, upon determining that there is no profile match between the near-end video and the far-end video, the client transmits, via the video conference, the near-end video for display at remote devices participating in the video conference and/or for facial recognition processing via the video conference. After 516, the visual echo cancellation workflow 500 ends.

At 518, upon determining that there is a profile match between the near-end video and the far-end video, the client removes the profile matching parts of the near-end video. The profile matching parts may be replaced with a portion of the captured (at 504) pre-conference visual profile or with another image. The other image may be a stored, default image at the client. For example, a logo of a business at which a user of the client is employed or a logo of a provider of the video conferencing software.

At 520, after removing the profile matching parts of the near-end video, the client transmits the near-end video (with the profile matching parts removed) for display at remote devices participating in the video conference and/or for facial recognition processing via the video conference. After 520, visual echo cancellation ends.

Some implementations are described with the visual echo cancellation software running at the client. However, in alternative implementations, the visual echo cancellation software may run at the conferencing server rather than at the client. If the visual echo cancellation software resides at the server, the visual echo cancellation software may be executed prior to transmission of the video from the client to the remote devices or to the facial recognition software at the conferencing software.

According to one use case, a client (e.g., the client 406) is set up in a conference room. Prior to the start of a video conference, an administrator runs setup software associated with the client conferencing software. During running of the setup software, the client scans the conference room using its camera and asks the user to confirm that there are no visual echo events (e.g., reflections of the display of the client). A scanned image of the conference room with no visual echo events is stored in a memory of the client.

When a video conference starts, users named Amy and Beth join from the conference room via the client, and a user named Chris joins remotely from a remote device. Chris' face is shown on the display of the client, and the display of the client is reflected in a window behind the display, making it appear as though Chris is in the window (in addition to being at the remote device).

Visual echo cancellation software (e.g., the visual echo cancellation software 410) at the client detects a profile match between the remote video of Chris and the reflection of that remote video in the window. The profile match may compute a probability that the window includes a reflection of Chris' remote video, and that probability may be determined to exceed a predefined threshold probability. Based on the probability exceeding the predefined threshold probability, the visual echo cancellation software modifies the near-end video generated by the camera of the client to replace the reflection of Chris' remote video with visual data corresponding to the window from the scan of the conference room generated prior to the start of the video conference. As a result, the reflection of Chris' remote video is not transmitted to Chris (who has a better view of Amy and Beth in the conference room), and the facial recognition software of the conferencing software detects Amy's and Beth's faces in the conference room and Chris' face at the remote device, but not Chris' face reflected in the window of the conference room.

At a certain point in the video conference, Chris screen-shares a slideshow from the remote device. The slideshow is presented at the client in the conference room and is reflected into the camera of the client via the window of the conference room. The visual echo cancellation software detects a profile match between Chris' screenshared content and the imagery reflected through the window. Based on the detected profile match, the visual echo cancellation software modifies the near-end video generated by the camera of the client to replace the reflection of the screensharing video with visual data corresponding to the window from the scan of the conference room generated prior to the start of the video conference. This improves the viewing experience of Chris (and other remote viewers of the video conference) as Chris can see Amy, Beth, and the conference room but not the reflection of his screensharing video in the window.

Figure 6A:
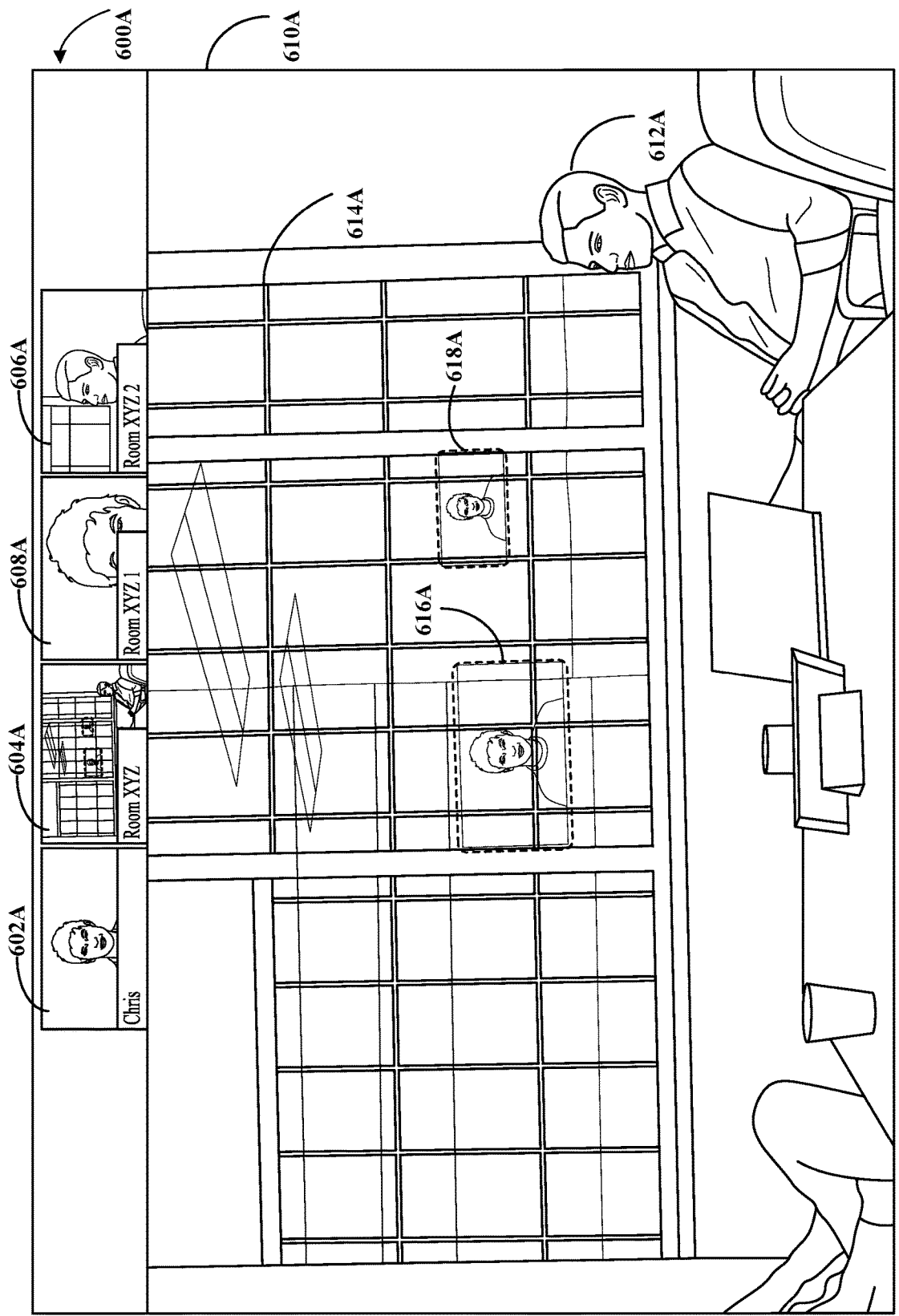
FIGS. 6A-6C are illustrations of examples of data output to a display during a video conference.
Figure 6B:
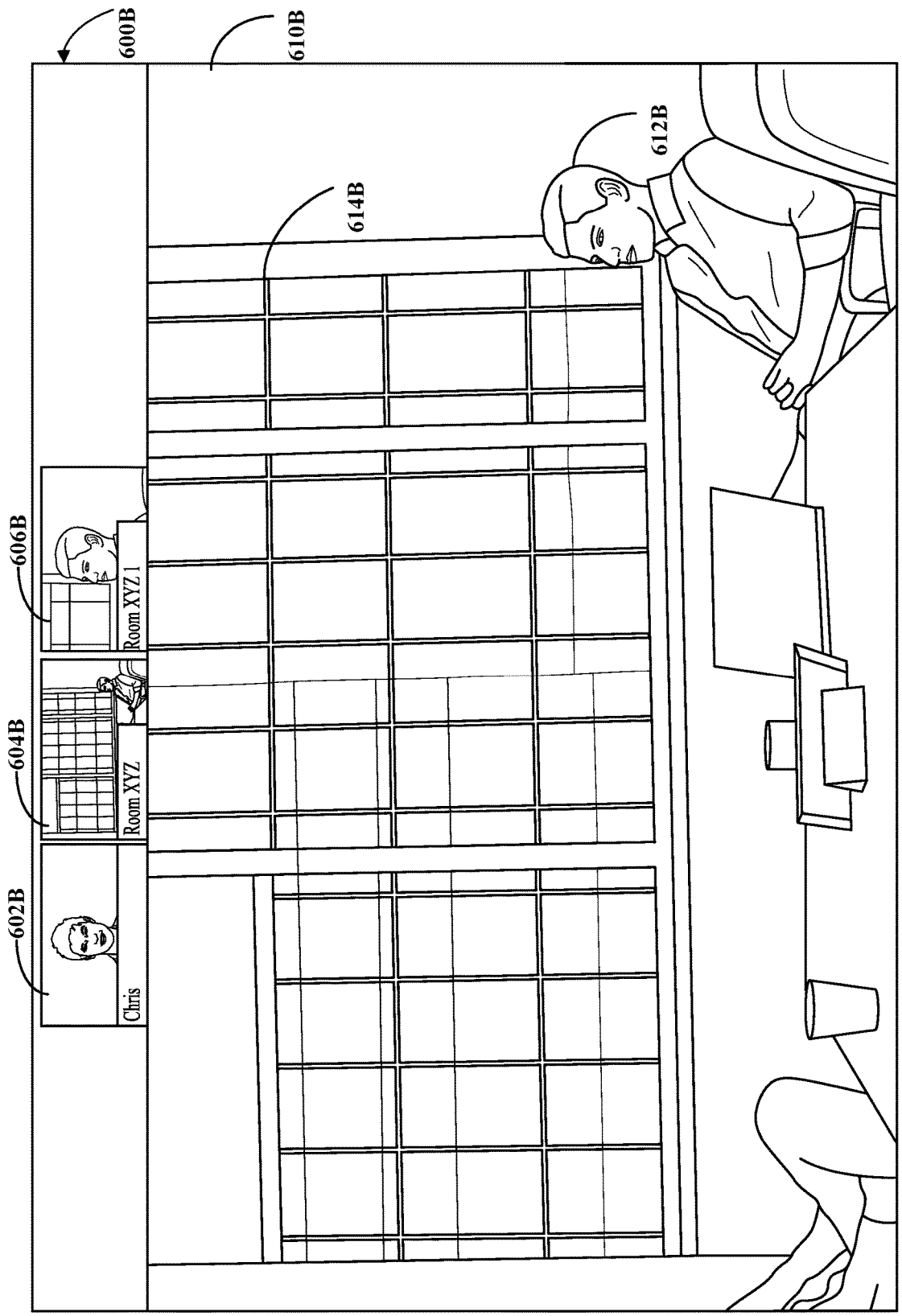
Figure 6C:
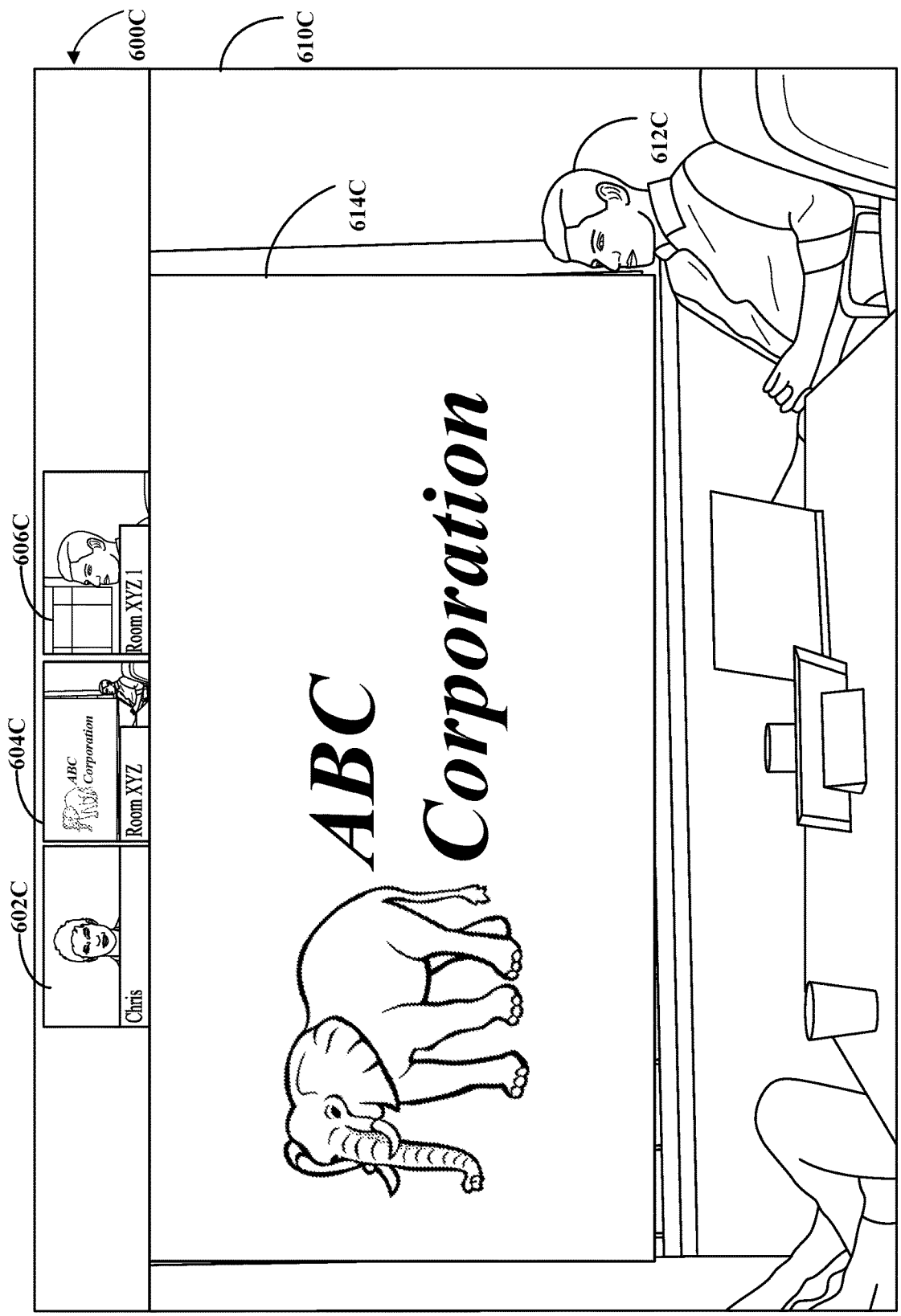

FIGS. 6A-6C are illustrations of examples of data output to a display during a video conference. The display may be of or coupled via wired or wireless connection to a client (e.g., the client 406) or other device used to participate in the video conference.

FIG. 6A is an example of data 600A output to a display during a video conference where visual echo cancellation is not implemented (or before the implementation of visual echo cancellation, for example, at the beginning of a conference where visual echo cancellation is to be implemented). As shown, the data 600A includes thumbnails 602A, 604A, 606A, and 608A, and a detailed view 610A. The thumbnail 602A corresponds to a video feed associated with a remote participant. As shown, the thumbnail 602A includes a face of a person (the remote participant). The thumbnail 604A corresponds to a video feed from the conference room where the client is located. The detailed view 610A also illustrates this video feed. As shown, the detailed view 610A shows a local participant 612A and a window 614A. The window 614A has reflections 616A, 618A of the remote participant from the thumbnail 602A.

The thumbnail 606A corresponds to a closeup view of the local participant 612A. The thumbnail 608A corresponds to a closeup view of the reflection 616A or 618A of the remote participant in the window 614A. The local participant 612A is correctly identified as a person participating in the video conference from the conference room using facial recognition software. The reflection 616A or 618A is incorrectly identified as a person participating in the video conference from the conference room using facial recognition software. Implementations of visual echo cancellation technology may be useful to identify the reflections 616A, 618A as visual echoes and to prevent the facial recognition software from incorrectly identifying these visual echoes as a person participating in the video conference from the conference room.

FIG. 6B is a first example of data 600B output to the display during the video conference upon applying visual echo cancellation to the data 600A of FIG. 6A. As shown, the data 600B includes thumbnails 602B, 604B, and 606B corresponding to the thumbnails 602A, 604A, and 606A, respectively. The data 600B includes the detailed view 610B corresponding to the detailed view 610A. The detailed view 610B shows the local participant 612B and the window 614B, corresponding to the local participant 612A and the window 614A, respectively. However, it should be noted that the window 614B does not show the reflection of the thumbnail 602B. The visual echo cancellation software may identify the reflections 616A, 618A in the window 614A and may replace those reflections (or the entire window) with an image of the window 614B generated prior to the video conference. This image of the window 614B includes the scene visible through the window, but not the reflections 616A, 618A. as shown, the image of the window 614B is a still image. However, in alternative implementations, a moving image or a video may be used in the position of the window 614B. For example, if the window 614B looks out onto a city street, a video or moving image recording of a few minutes of traffic on that city street may be shown at the position of the window. It should be noted that, as the reflections 616A, 618A are not shown in the window 614B of FIG. 6B, a thumbnail corresponding to the thumbnail 608A (associated with the reflections 616A, 618A) is lacking in FIG. 6B. In the implementation of FIG. 6B, the facial recognition software does not process the reflections 616A, 618A, and, therefore, does not erroneously detect the person in the thumbnail 608A as a local participant. The thumbnail 606B correctly corresponds to the local participant 612B who is in the conference room. It should be noted that, while the entire window 614B is occluded. In alternative embodiments, the occlusion may cover up only the reflections 616A, 618A.

FIG. 6C is a second example of data 600C output to the display during the video conference upon applying visual echo cancellation to the data 600A of FIG. 6A. As shown, the data 600C includes thumbnails 602C, 604C, and 606C corresponding to the thumbnails 602A, 604A, and 606A, respectively. The data 600C includes the detailed view 610C corresponding to the detailed view 610C. The detailed view 610C shows the local participant 612C (corresponding to the local participant 612A) and a block 614C in place of the window 614A. As shown, the block 614C includes a company logo of ABC Corporation. However, it should be noted that the company logo may be replaced with any other still image, moving image or video. The block 614C lacks the reflections 616A, 618A from FIG. 6A. It should be noted that, while the entire window 614C is occluded with the company logo. In alternative embodiments, the occlusion may cover up only the reflections 616C, 618C, and not the entire space occupied by the window 614A, 614C.

Figure 7:
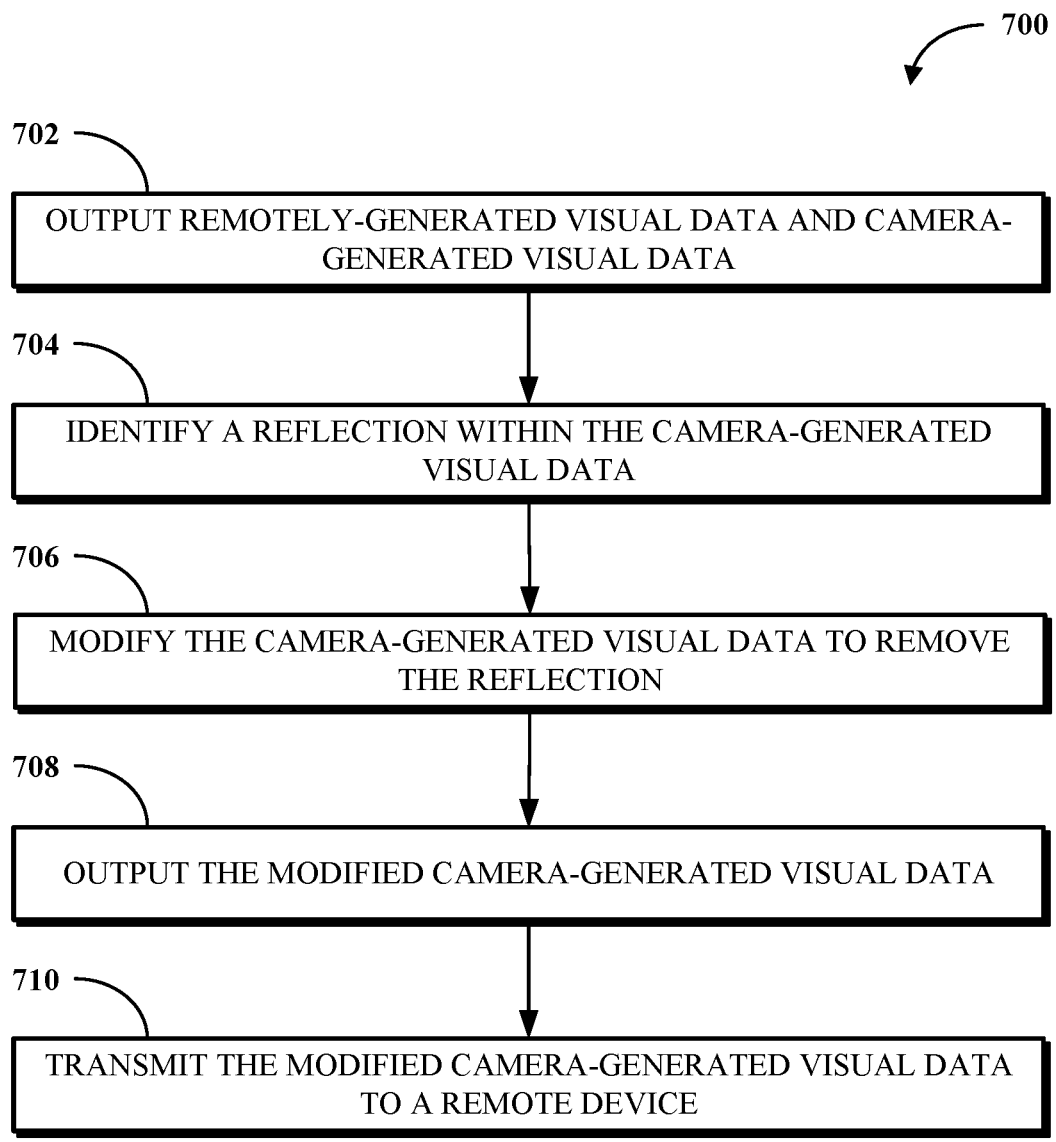
FIG. 7 is a flowchart of an example of a technique for visual echo cancellation.

To further describe some implementations in greater detail, reference is next made to examples of techniques which may be performed by or using a client or a conferencing server. FIG. 7 is a flowchart of an example of a technique 700 for visual echo cancellation. The technique 700 can be executed using computing devices, such as the systems, hardware, and software described with respect to FIGS. 1-6C. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The technique 700 is described as being implemented at a computing device. The computing device may correspond to the client 406, the computing device 200, or another computing device having another configuration.

At 702, the computing device outputs, to the display of the computing device during a video conference, remotely-generated visual data obtained from at least one remote device and camera-generated visual data captured using a camera of the computing device. The computing device may display thumbnail views of the camera-generated visual data and the remotely-generated visual data from each remote device. The computing device may also display a detailed view of the remotely-generated visual data from one of the remote devices or of the camera-generated visual data (e.g., as shown in FIG. 6A).

At 704, the computing device identifies, within the camera-generated visual data, a reflection of at least a portion of data displayed at the display of the computing device. For example, the computing device may store background visual data associated with a background of a field of view of the camera of the computing device. The computing device may identify the reflection by comparing the background visual data and the remotely-generated visual data with the camera-generated visual data. In another example, the computing device computes a similarity score between a part of the remotely-generated visual data and a part of the camera-generated visual data. The similarity score accounts for visual echo events (e.g., reflections, refractions, or distortions of light which may occur, for example, when an image on an electronic display is reflected in at least one of a window, a mirror, or a blank monitor) detected using a camera of the computing device. The computing device determines that the part of the camera-generated visual data comprises the reflection if the similarity score exceeds a threshold. In yet another example, the reflection may be identified based on a stored position of the camera, a stored position of the display, and a computed reflection angle associated with a surface (e.g., a window as shown in FIG. 6A) generating the reflection.

At 706, the computing device modifies the camera-generated visual data to remove the reflection. Modifying the camera-generated visual data may include replacing a portion of the camera-generated visual data with a portion of the background visual data. The computing device (or a server external to the computing device) may apply facial recognition to the modified camera-generated visual data to identify at least one user participating in the video conference via the computing device. Alternatively, modifying the camera-generated visual data to remove the reflection may include replacing, within the camera-generated visual data, the reflection with at least a portion of a preset image. The preset image may be, for example, a company logo (e.g., as shown in FIG. 6C) or an image of a previously existing view out of a window (e.g., as shown in FIG. 6B). In another example, to modify the camera-generated visual data to remove the reflection, the computing device identifies, within the camera-generated visual data, a reflective surface. The computing device replaces at least a portion of the reflective surface with at least a portion of the preset image. Identification of the reflective surface may be accomplished, for example, using a convolutional neural network that is trained to identify reflective surfaces such as mirrors, windows, blank monitors, aquarium tanks, and the like.

At 708, the computing device outputs, to the display of the computing device during the video conference, the modified camera-generated visual data. As a result, a user of the computing device can see the camera-generated visual data without seeing reflections of the display. This may lead to a more pleasant viewing experience for a user of the computing device.

At 710, the computing device transmits the modified camera-generated visual data to at least one remote device for display thereat during the video conference. The modified camera-generated visual data may also be transmitted to a server for processing thereat. For example, the server may apply facial recognition technology to identify individual human participants who are accessing the video conference via the computing device. The removal of the reflections of the display from the modified camera-generated visual data allows the facial recognition technology to forego false positive identification of faces in the reflections.

Some implementations are described below as numbered examples (Example 1, 2, 3, etc.). These examples are provided as examples only and do not limit the other implementations disclosed herein.

Example 1 is a method, comprising: outputting, to a display of a computing device during a video conference, remotely-generated visual data obtained from at least one remote device and camera-generated visual data captured using a camera of the computing device; identifying, within the camera-generated visual data, a reflection of at least a portion of data displayed at the display of the computing device; modifying the camera-generated visual data to remove the reflection; and transmitting the modified camera-generated visual data to the at least one remote device for display thereat during the video conference.

Example 2 includes the subject matter of Example 1 and includes, outputting, to the display of the computing device during the video conference, the modified camera-generated visual data.

Example 3 includes the subject matter of Examples 1-2 and includes, storing, at the computing device, background visual data associated with a background of a field of view of the camera of the computing device, wherein the reflection is identified based on the background visual data, wherein modifying the camera-generated visual data comprises replacing a portion of the camera-generated visual data with a portion of the background visual data.

Example 4 includes the subject matter of Examples 1-3 and includes, wherein identifying the reflection comprises: computing a similarity score between a part of the remotely-generated visual data and a part of the camera-generated visual data, wherein the similarity score accounts for visual echo events detected using the camera of the computing device; and determining that the part of the camera-generated visual data comprises the reflection if the similarity score exceeds a threshold.

Example 5 includes the subject matter of Examples 1-4 and includes, applying facial recognition to the modified camera-generated visual data to identify at least one user participating in the video conference via the computing device.

Example 6 includes the subject matter of Examples 1-5 and includes, wherein the reflection is identified based on a stored position of the camera, a stored position of the display, and a computed reflection angle associated with a surface generating the reflection.

Example 7 includes the subject matter of Examples 1-6 and includes, wherein modifying the camera-generated visual data to remove the reflection comprises replacing, within the camera-generated visual data, the reflection with at least a portion of a preset image.

Example 8 includes the subject matter of Examples 1-7 and includes, wherein modifying the camera-generated visual data to remove the reflection comprises: identifying, within the camera-generated visual data, a reflective surface; and replacing, within the camera-generated visual data, the reflective surface with at least a portion of a preset image.

Example 9 is a non-transitory computer readable medium storing instructions operable to cause one or more processors to perform operations comprising: outputting, to a display of a computing device during a video conference, remotely-generated visual data obtained from at least one remote device and camera-generated visual data captured using a camera of the computing device; identifying, within the camera-generated visual data, a reflection of at least a portion of data displayed at the display of the computing device; modifying the camera-generated visual data to remove the reflection; and transmitting the modified camera-generated visual data to the at least one remote device for display thereat during the video conference.

Example 10 includes the subject matter of Example 9 and includes, the operations comprising: storing a background image associated with a background of a field of view of the camera of the computing device, wherein the reflection is identified based on the background image, wherein modifying the camera-generated visual data comprises replacing a portion of the camera-generated visual data with a portion of the background image.

Example 11 includes the subject matter of Examples 9-10 and includes, wherein identifying the reflection comprises: computing a similarity score between a part of the remotely-generated visual data and a part of the camera-generated visual data; and determining that the part of the camera-generated visual data comprises the reflection if the similarity score is within a predefined range.

Example 12 includes the subject matter of Examples 9-11 and includes, the operations comprising: applying facial recognition to the modified camera-generated visual data to identify a user participating in the video conference; and generating a closeup view of the identified user.

Example 13 includes the subject matter of Examples 9-12 and includes, wherein the reflection is identified based on a stored camera location, a stored display location, and a computed reflection angle associated with a surface generating the reflection.

Example 14 includes the subject matter of Examples 9-13 and includes, wherein modifying the camera-generated visual data to remove the reflection comprises replacing the reflection with at least a portion of a preset image.

Example 15 is an apparatus, comprising: a memory; and a processor configured to execute instructions stored in the memory to: output, to a display of a computing device during a video conference, remotely-generated visual data obtained from at least one remote device and camera-generated visual data captured using a camera of the computing device; identify, within the camera-generated visual data, a reflection of at least a portion of data displayed at the display of the computing device; modify the camera-generated visual data to remove the reflection; and transmit the modified camera-generated visual data to the at least one remote device for display thereat during the video conference.

Example 16 includes the subject matter of Example 15 and includes, the processor further configured to execute the instructions stored in the memory to: identify the reflection based on stored background visual data associated with a background of a field of view of the camera, wherein modifying the camera-generated visual data comprises replacing a portion of the camera-generated visual data with a portion of the background visual data.

Example 17 includes the subject matter of Examples 15-16 and includes, wherein identifying the reflection comprises: computing a similarity score between a part of the remotely-generated visual data and a part of the camera-generated visual data, wherein the similarity score accounts for reflections, refractions, or distortions detected using the camera of the computing device; and determining that the part of the camera-generated visual data comprises the reflection if the similarity score exceeds a threshold.

Example 18 includes the subject matter of Examples 15-17 and includes, the processor further configured to execute the instructions stored in the memory to: identify at least one user participating in the video conference via the computing device via facial recognition software applied to the modified camera-generated visual data.

Example 19 includes the subject matter of Examples 15-18 and includes, wherein the reflection is identified based on a computed reflection angle associated with a surface generating the reflection.

Example 20 includes the subject matter of Examples 15-19 and includes, wherein modifying the camera-generated visual data to remove the reflection comprises replacing, within the camera-generated visual data, the reflection with a stored image.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
outputting, to a display of a computing device during a video conference, remotely-generated visual data obtained from at least one remote device and camera-generated visual data captured using a camera of the computing device;
identifying, within the camera-generated visual data, a reflection of at least a portion of data displayed at the display of the computing device by:

computing a similarity score between a part of the remotely-generated visual data and a part of the camera-generated visual data; and determining that the part of the camera-generated visual data comprises the reflection if the similarity score exceeds a threshold;

modifying the camera-generated visual data to remove the reflection; and transmitting the modified camera-generated visual data to the at least one remote device for display thereat during the video conference.

2. The method of claim 1, comprising:

outputting, to the display of the computing device during the video conference, the modified camera-generated visual data.

3. The method of claim 1, comprising:

storing, at the computing device, background visual data associated with a background of a field of view of the camera of the computing device, wherein the reflection is identified based on the background visual data, wherein modifying the camera-generated visual data comprises replacing a portion of the camera-generated visual data with a portion of the background visual data.

4. The method of claim 1, wherein the similarity score accounts for visual echo events detected using the camera of the computing device.

5. The method of claim 1, comprising:

applying facial recognition to the modified camera-generated visual data to identify at least one user participating in the video conference via the computing device.

6. The method of claim 1, wherein the reflection is identified based on a stored position of the camera, a stored position of the display, and a computed reflection angle associated with a surface generating the reflection.

7. The method of claim 1, wherein modifying the camera-generated visual data to remove the reflection comprises replacing, within the camera-generated visual data, the reflection with at least a portion of a preset image.

8. The method of claim 1, wherein modifying the camera-generated visual data to remove the reflection comprises:

identifying, within the camera-generated visual data, a reflective surface; and replacing, within the camera-generated visual data, the reflective surface with at least a portion of a preset image.

9. A non-transitory computer readable medium storing instructions operable to cause one or more processors to perform operations comprising:

outputting, to a display of a computing device during a video conference, remotely-generated visual data obtained from at least one remote device and camera-generated visual data captured using a camera of the computing device;

identifying, within the camera-generated visual data, a reflection of at least a portion of data displayed at the display of the computing device by:

computing a similarity score between a part of the remotely-generated visual data and a part of the camera-generated visual data; and determining that the part of the camera-generated visual data comprises the reflection if the similarity score is within a predefined range;

modifying the camera-generated visual data to remove the reflection; and transmitting the modified camera-generated visual data to the at least one remote device for display thereat during the video conference.

10. The computer readable medium of claim 9, the operations comprising:

storing a background image associated with a background of a field of view of the camera of the computing device, wherein the reflection is identified based on the background image, wherein modifying the camera-generated visual data comprises replacing a portion of the camera-generated visual data with a portion of the background image.

11. The computer readable medium of claim 9, the operations comprising:

applying facial recognition to the modified camera-generated visual data to identify a user participating in the video conference; and generating a closeup view of the identified user.

12. The computer readable medium of claim 9, wherein the reflection is identified based on a stored camera location, a stored display location, and a computed reflection angle associated with a surface generating the reflection.

13. The computer readable medium of claim 9, wherein modifying the camera-generated visual data to remove the reflection comprises replacing the reflection with at least a portion of a preset image.

14. An apparatus, comprising:

a memory; and a processor configured to execute instructions stored in the memory to:

output, to a display of a computing device during a video conference, remotely-generated visual data obtained from at least one remote device and camera-generated visual data captured using a camera of the computing device;

identify, within the camera-generated visual data, a reflection of at least a portion of data displayed at the display of the computing device by:

computing a similarity score between a part of the remotely-generated visual data and a part of the camera-generated visual data; and determining that the part of the camera-generated visual data comprises the reflection if the similarity score exceeds a threshold;

modify the camera-generated visual data to remove the reflection; and transmit the modified camera-generated visual data to the at least one remote device for display thereat during the video conference.

15. The apparatus of claim 14, the processor further configured to execute the instructions stored in the memory to:

identify the reflection based on stored background visual data associated with a background of a field of view of the camera, wherein modifying the camera-generated visual data comprises replacing a portion of the camera-generated visual data with a portion of the background visual data.

16. The apparatus of claim 14, wherein the similarity score accounts for reflections, refractions, or distortions detected using the camera of the computing device.

17. The apparatus of claim 14, the processor further configured to execute the instructions stored in the memory to:
    identify at least one user participating in the video conference via the computing device via facial recognition software applied to the modified camera-generated visual data.

18. The apparatus of claim 14, wherein the reflection is identified based on a computed reflection angle associated with a surface generating the reflection.

19. The apparatus of claim 14, wherein modifying the camera-generated visual data to remove the reflection comprises replacing, within the camera-generated visual data, the reflection with a stored image.

* * * * *